United States Patent [19]

Sawano

[11] 4,148,562

[45] Apr. 10, 1979

[54] LENS BARREL FOR CAMERA HAVING LENS AND CAMERA DISPLACING MECHANISMS ON RESPECTIVE SIDES OF STATIONARY SUPPORTING STRUCTURE

[75] Inventor: Hiroshi Sawano, Tokorozawa, Japan

[73] Assignee: Konishiroku Photo Industry Co., Ltd., Tokyo, Japan

[21] Appl. No.: 793,880

[22] Filed: May 4, 1977

[30] Foreign Application Priority Data

May 10, 1976 [JP] Japan .................................. 51-52196

[51] Int. Cl.² .......................... G02B 7/04; G03B 3/04; G03B 13/18
[52] U.S. Cl. .................................... 350/255; 354/195
[58] Field of Search ................. 350/255, 257, 247, 44, 350/76–77, 187; 353/101, 76; 354/81, 195, 197, 286, 293; 352/139–140

[56] References Cited

U.S. PATENT DOCUMENTS

| | | | |
|---|---|---|---|
| 2,315,977 | 4/1943 | Mihalyi | 350/255 |
| 3,119,891 | 1/1964 | Ferrari et al. | 354/197 |
| 3,850,507 | 11/1974 | Uesugi | 354/197 |

Primary Examiner—John K. Corbin
Assistant Examiner—Wm. H. Punter
Attorney, Agent, or Firm—Bierman & Bierman

[57] ABSTRACT

According to the invention, a helicoid mechanism is provided at each side of a supporting member of the lens barrel fixed by a tripod seat or the like, the front one being intended for effecting the displacement of the lens while the rear one being intended for displacing the camera, whereby a larger stroke of the lens displacement which is materially twice the conventional one is obtained with machining precision of conventional helicoid means.

Means are provided for representing accurately the photo-taking distance, irrespective of whether either one of the front and rear helicoid mechanisms is solely adjusted, both of these helicoid mechanisms are individually adjusted or both of them are simultaneously operated, so as to render the operation of these helicoids free and to ensure an easier and more exact reading of the photo-taking distance.

2 Claims, 4 Drawing Figures

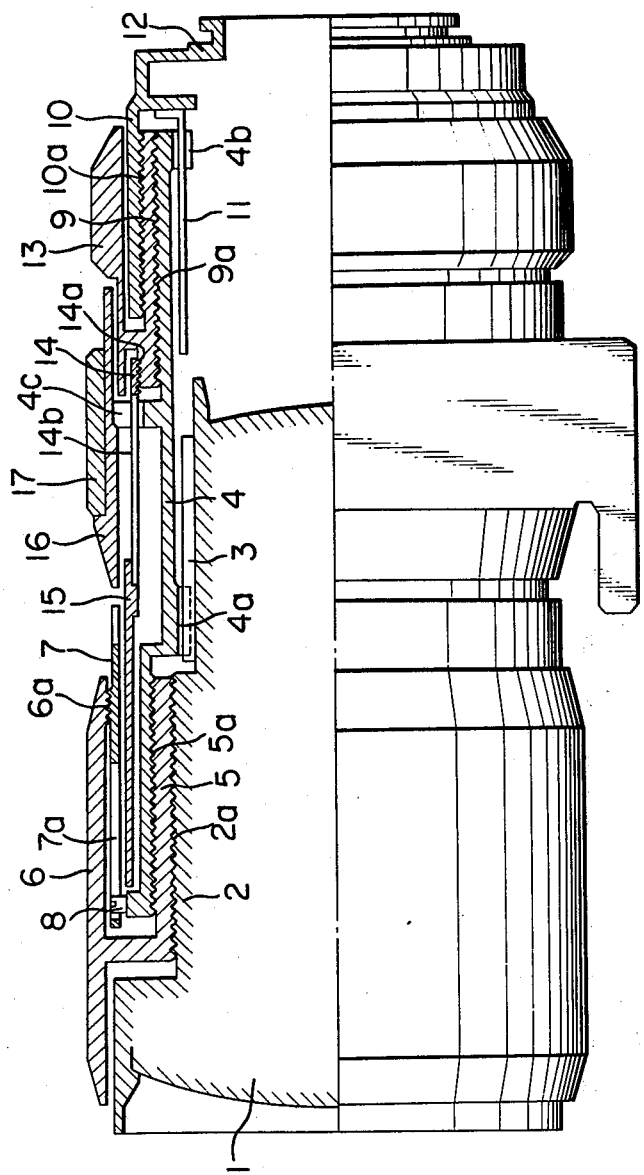

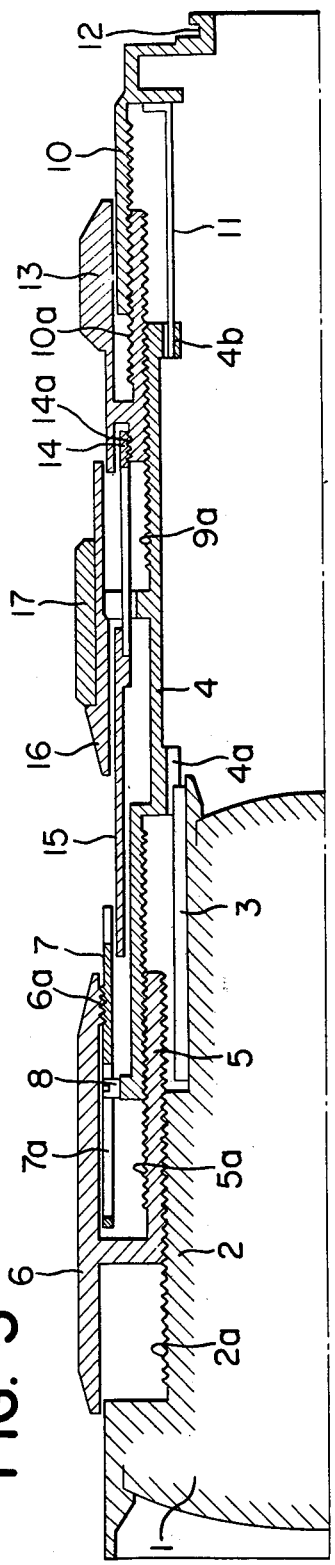
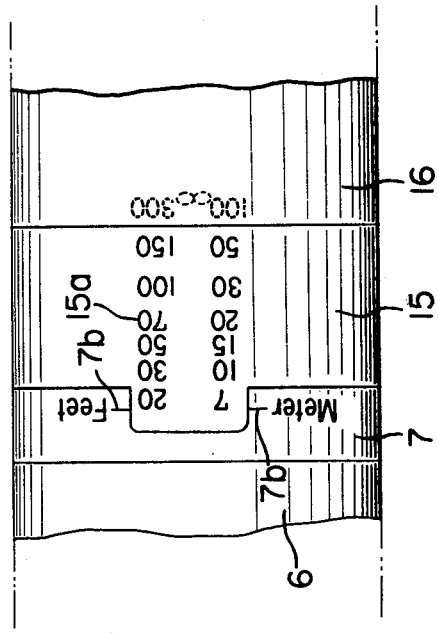

LENS BARREL FOR CAMERA HAVING LENS AND CAMERA DISPLACING MECHANISMS ON RESPECTIVE SIDES OF STATIONARY SUPPORTING STRUCTURE

Several methods have been proposed to obtain a large displacement of lens in a lens barrel of ultratelephoto lens or macro lens, typical ones of which are listed below.

a. To displace a camera by means of a rack and pinion mechanism placed between the camera and a lens fixing means such as a tripod seat.

b. To use a set of helicoid thread of the type commonly used in ordinary lens means, in place of the rack and pinion mechanism.

Among these conventional methods, the method (a) has a fundamental drawback that it cannot provide a fine adjustment for focusing, as well as inconvenience due to the use of conventional bellows. The method (b) relying upon the helicoid thread has also a drawback in that amount of stroke provided by the set of helicoid thread has a fixed limit caused by lead of the helicoid thread. More specifically, allowance between the width of a thread groove and a cutting tool provided at the time of threading operation is determined by machining precision of a machine to be used for threading and such allowance as determined by the machining precision is formed in a direction perpendicular to a lead angle, so that practical play produced in the direction of an optical axis of the lens becomes greater than the allowance according to a trigonometrical function. In other words, since the axial allowance produced between male and female helicoid threads at the time of their engagement, that is play to be discussed as an actual problem, will be greater for a thread having a larger lead angle than that having a smaller lead angle. For the reason as above-mentioned, it is necessary to limit the axial allowance within the range allowing to satisfy the required precision in order to manufacture a helicoid thread requiring high precision of engagement. This results in that the lead angle cannot be great from the standpoint of assurance of precision. To the contrary, this means that a thread having a large lead angle provides a large wedge action and it is therefore one of the reasons for refraining from use of the thread having a large lead angle that the provision of a large lead angle will cause a large torque required for the turning operation.

In order to provide a large amount of stroke of a lens while avoiding such drawbacks, it is required to increase effective amount of rotation of the helicoid thread. In an ordinary lens, however, a diaphragm mechanism is equipped inside a lens barrel and it is impossible to use a mechanism allowing an operation of 360 degrees to ensure mechanical rigidity of the barrel structure. For this reason, a diameter of the helicoid thread must be large to increase the effective amount of rotation of the helicoid thread with the result that the lens will be of large size.

However, the helicoid mechanism itself is superior in precision and durability as a moving mechanism for means such as lens or the like which will require high precision as compared with other moving mechanism such as a rack and pinion mechanism and a sliding mechanism, and therefore it is very advantageous to take advantage of such superiority of the helicoid thread mechanism.

In the present invention, it is intended to compensate for the drawbacks inherent to the large lead by making use of a plurality of sets of helicoid thread mechanisms. However, this is still not sufficient for a photographing lens, because distribution of weight of a lens as a whole inclusive of a camera will change to a great extent at the time of focussing in the event that such a large amount of lead is imparted by means of a plurality of sets of helicoid mechanisms and there is a fear that the lens is not held in stable fashion. This is particularly so with a telephoto lens and a change in distribution of weight will have a great inverse effect on the lens holding function due to large length and weight of the lens itself.

It is therefore an object of the invention to provide a lens barrel for a camera which is more free from limit of the stroke of the lens displacement imparted by the helicoid mechanism, while preserving the advantages of the latter.

According to the invention, a helicoid mechanism is provided at each side of a supporting member of the lens barrel fixed by a tripod seat or the like, the front one being intended for effecting the displacement of the lens while the rear one being intended for displacing the camera, to balance the change in distribution of weight with respect to the supporting member whereby a larger stroke of the lens displacement which is materially twice the conventional one is obtained with machining precision of conventional helicoid means.

In the event that a helicoid mechanism is provided at each side of the supporting member located nearly at the center of the lens barrel, the entire amount of stroke of the lens barrel as a whole will be sum of the amounts of stroke of the respective helicoid mechanisms, so that, for a given angle of rotation, it becomes possible to reduce the amount of stroke for each helicoid mechanism to less than the stroke of a single helicoid mechanism employed according to the prior art system.

Therefore, if it is assumed that amount of stroke of the lens barrel required for focussing adjustment is fixed, it becomes possible according to the present invention to reduce the amount of stroke for each of the helicoid mechanisms remarkably less than that of the single helicoid mechanism according to the prior art system and thus precision of engagement of the helicoid mechanisms can be heightened more. On the other hand, if it is assumed that amount of lead of the helicoid mechanism for a given angle of rotation is the same, the entire amount of lead can be doubled as compared with that of the prior art system. This is quite advantageous when it is desired to provide a lens barrel which requires large amount of stroke.

Means are provided for representing accurately the photo-taking distance, irrespective of whether either one of the front and rear helicoid mechanisms is solely adjusted, both of these helicoid mechanisms are individually adjusted or both of them are simultaneously operated, so as to render the operation of these helicoids free and to ensure an easier and more exact reading of the photo-taking distance. With the present invention constructed as above-mentioned, no disadvantage is caused by the manner in which the helicoid mechanisms are operated.

The attached drawings show a lens barrel for a camera of the type in which the lens barrel is detachably mounted on the camera, embodying the present invention in which:

FIG. 1 is a sectional view of a half part of the lens barrel adjusted for infinite focusing, FIG. 2 is an illustration showing the manner of representing the distance by a scale, FIG. 3 is a sectional view of an essential part of the lens barrel adjusted to the maximum stroke for close object, and FIG. 4 is an illustration showing the scale at the state of FIG. 3.

Referring to the drawings, especially to FIGS. 1 and 3 showing in section a half part of essential portion of the lens barrel at the state adjusted for infinite and closest focusing, respectively, a lens holder 1 housing a group of lenses has at its intermediate portion a first helicoid 2 which constitutes a front helicoid, and at its rear portion a straight-movement guiding plate 3 for the straight movement of the lens group.

The guiding plate 3 is adapted to engage an axially elongated slot 4a formed in a stationary barrel part (or a stationary body) 4 for guiding the group of lenses linearly or straightly.

A helicoid screw 5a formed on the inner periphery of the stationary part 4 and a first front helicoid screw 2a formed around the first front helicoid 2 constitute, in combination with a second front helicoid 5 interposed therebetween, a double helicoid mechanism. The aforementioned focusing ring is formed on the outer periphery of the second helicoid 5 unitarily with the later. The arrangement is such that the second front helicoid 5 is rotated as the focusing ring 6 is rotated, which in turn causes the lens holder 1 to move back and forth in the direction of the optical axis, through screwing engagement of the second front helicoid 5 and the aforementioned helicoid screws 5a, 2a.

At the rear end portion of the focusing ring 6, there is provided an inner peripheral screw 6a of a small lead adapted to be engaged by an index ring 7 having an elongated slot 7a extending in the direction of the optical axis. The elongated groove 7a slidably receives a pin 8 fixed to the outer periphery of the stationary part 4 at the front portion of the latter, so that the index ring 7 may be straight moved, without being rotated, following the focusing ring 6 by the optic-axial movement of the second front helicoid 5 resulted from the rotation of the focusing ring 6.

At the rear end portion of the stationary part 4, an outer peripheral second rear helicoid 9 is provided engaged by a helicoid screw 9a. A first rear helicoid 10 has a helicoid screw 10a engaging the second rear helicoid 9. The first and the second rear helicoids in combination constitute a double helicoid mechanism. A rear guiding plate 11 provided on the inner peripheral wall of the first rear helicoid 10 is slidable within an optic-axially extending elongated groove 4b formed at the rear portion of the stationary part 4 in the inner peripheral wall of the latter, so as to prevent the first rear helicoid 10 from being rotated, while allowing a camera (not shown) attached to a mount 12 formed on the rear end of the first helicoid 10 to straight move back and forth.

On the outer periphery of the second rear helicoid 9, unitarily provided is a rear focusing ring 13, while an interlocking ring 14 is screwed onto the front portion of the second rear helicoid 9 by means of a screw 14a of a small lead. A connecting rod 14b extending in the direction of the optical axis from the interlocking ring 14 is passed through a guide groove 4c formed in the stationary part 4, so that the interlocking ring 14 may be moved straight back and forth without being rotated by the rotation of the second rear helicoid 9.

The connecting rod 14b of the interlocking ring 14 carries at its end a scale ring 15 adapted to be received by the index ring 7. The stationary part 4 is adapted to be kept stationary, by a peripheral tripod fixing seat 16 which in turn is supported by a tripod seat 17.

Representing the leads of the first front helicoid screw 2a, second front helicoid screw 5a, first rear helicoid screw 10a and the second rear helicoid screw 9a, respectively, by L1, L2, L3 and L4, they are selected to satisfy the following equations.

$$L1 + L2 = L3 + L4$$

$$L2 = L4$$

In operation, the stationary part 4 of the barrel is fixed by, for example, attaching the tripod seat 17 to a tripod. A camera is attached to the mount 12 on the rear end of the first rear helicoid 10. As the front focusing ring 6 is rotated from the state of FIG. 1, it is moved ahead along with the second front helicoid 5, by means of the helicoid screw 5a. Simultaneously, by means of the first front helicoid screw 2a, as well as by the engagement of the guiding plate 3 with the elongated groove 4a, the lens holder 1 carrying the group of the lenses is moved straight ahead with respect to the front focusing ring 6. More specifically, as the focusing ring 6 travels a distance L2, the group of the lenses moves by a distance L1+L2. At this state, since the index ring 7 moves straight following the focusing ring 6, the point 7b moves along the scale 15a on the scale ring 15 progressively, indicating the photo-taking distance as is seen from FIG. 2. For close object, the rear focusing ring 13 is rotated to move the first rear helicoid 10 backward with respect to the stationary part 4, by the double helicoid mechanism constituted by the first and the second rear helicoid screws 10a and 9a. Consequently, the camera is moved backwardly along with the scale ring 15 carried by the connecting rod 14, so that the point 7b may point the distance scale on the scale ring 15.

The scale 15a on the scale ring 15 can be represented by the following equation.

Distance travelled by lens from a certain point of scale $\times \dfrac{L2}{L1 + L2}$ or Distance travelled by lens from a certain point of scale $\times \dfrac{L4}{L3 + L4}$ Since there are relationships represented by $$L1 + L2 = L3 + L4$$

and $$L2 = L4$$

As aforementioned, the scale 15a can be calculated and marked from the leads of the first and the second helicoid screws over entire focal length, irrespective of the front and the rear.

As the focusing rings 6, 13 are further operated, they come to be stopped by respective stoppers (not shown) so as to provide the closest focusing. Then, the relationship between the point 7b and the scale 15a is as shown in FIG. 4.

According to the illustrated structure, since the index ring 7 engages the front focusing ring 6 with a screw of a small lead 6a, and since the interlocking ring 14 engages the rear focusing ring 13 also by a small lead screw 14a, the additional straight movement by the screws 6a and 14a is negligibly small, during the linear (non-rotating) movement of the index ring 7 or of the scale ring 15 (i.e. of the connecting rod 14) caused by the rotation of the focusing rings 6,13. Thus, the screwing engagement by the screws 6a, 14a may be substituted by engagements of an annular groove and a projection adapted to be fitted into the groove, respectively.

According to the above described construction, either one of the focusing rings 6,13 may be operated first of all. Moreover, both of the focusing rings may be operated to provide a desired focal length by the sum of the rotations of the rings, i.e. the sum of the displacements of the group of the lenses and the camera. In addition, the adjusted distance can be directly read from the scale. The photographer need not move himself during the focusing operation, which provides a convenience over conventional ultra-telephoto lens barrel adapted to move the camera.

The focusing operation will be simplified, when the position of the camera is previously set at a suitable position, leaving the final adjustment to the front focusing lens 6.

As mentioned before, the focal distance adjustment in the conventional camera has been made by either one of the front and the rear sides of the barrel of the invention. Consequently, the displacement of the lens relative to the camera is conveniently doubled in accordance with the invention.

In the foregoing, explanation has been given to a camera of the type in which a lens barrel is detachably mounted on the camera, but the lens barrel according to the invention is of course applicable to a camera of another type in which a lens barrel is fixed to the camera.

Furthermore, it is to be noted that the lens barrel according to the invention can well be applied not only an ordinary still camera, but also other kinds of camera such as a cine camera, a television camera and an air camera.

What is claimed is:

1. A lens barrel for a camera comprising:
   a photographing lens;
   a supporting member 17 placed onto nearly a central portion of said lens barrel;
   a stationary barrel 4 supported by said supporting member 17 and having a front portion and a rear portion jutting out respectively to both sides of said supporting member 17 and further having two linear guides formed thereon in parallel to an optical axis of said lens;
   a front screw 5a provided on said front portion of said stationary barrel 4;
   a rear screw 9a provided on said rear portion of said stationary barrel 4;
   a first focussing ring 6 having an outer screw, an inner screw and a handling portion, said outer screw being engaged with said front screw 5a of said stationary barrel 4 and said handling portion being exposed around over the outer peripheral surface of the front portion of said lens barrel;
   a lens holder 1, including said lens therein and engaged respectively with said inner screw of said first focussing ring 6 and with one of said linear guides of said stationary barrel 4;
   a second focussing ring 13 having an outer screw, an inner screw and a handling portion, said inner screw of said second focussing ring 13 being engaged with said rear screw 9a of said stationary barrel 4 and said handling portion being exposed around over the outer peripheral surface of the rear portion of said lens barrel 4; and
   a mounting member engaged respectively with said outer screw of said second focussing ring 13 and with the other of said linear guides of said stationary barrel 4, and having a mount portion 12 on a rear end thereof for connecting between said lens barrel and the camera.

2. A lens barrel as set forth in claim 1 further comprising:
   a pair of sliding members provided between said first focussing ring 6 and second focussing ring 13 through said supporting member 17 and movable respectively along the lens axis toward each other and a combination of an indicator and a scale provided on said pair of said sliding members for indicating the value of the focussing distance with respect to said lens;
   one of said pair of sliding members being held by said first focussing ring 6 so as to be movable with said latter along the lens axis, but being unrotatable when said first focussing ring 6 is rotated and
   the other of said pair of sliding member being held by said second focussing ring 13 so as to be movable with said latter along the lens axis but being unrotatable when said second focussing ring 13 is rotated.

* * * * *